United States Patent
Dahl et al.

(10) Patent No.: US 11,619,181 B2
(45) Date of Patent: Apr. 4, 2023

(54) VARIABLE VALVE TIMING INTERNAL COMBUSTION ENGINE

(71) Applicant: Scania CV AB, Södertälje (SE)

(72) Inventors: Andreas Dahl, Nyköping (SE); Erik Lind, Stockholm (SE); Christopher Ringström, Hölö (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/492,245

(22) Filed: Oct. 1, 2021

(65) Prior Publication Data

US 2022/0112847 A1 Apr. 14, 2022

(30) Foreign Application Priority Data

Oct. 9, 2020 (SE) .................... 2051179-6

(51) Int. Cl.
*F02D 13/02* (2006.01)
*F02D 35/02* (2006.01)
*F02D 13/04* (2006.01)

(52) U.S. Cl.
CPC ..... *F02D 13/0215* (2013.01); *F02D 13/0203* (2013.01); *F02D 13/0265* (2013.01); *F02D 13/04* (2013.01); *F02D 35/023* (2013.01)

(58) Field of Classification Search
CPC ............ F02D 13/0203; F02D 13/0215; F02D 13/0249; F02D 13/0261; F02D 13/0265; F02D 13/04; F02D 35/023; F02D 35/024
USPC ................... 123/90.15–90.18, 321, 322, 435
See application file for complete search history.

(56) References Cited

U.S. PATENT DOCUMENTS

| | | | |
|---|---|---|---|
| 5,117,790 A * | 6/1992 | Clarke | F02D 13/0273 123/90.11 |
| 8,714,123 B2 | 5/2014 | Rollinger et al. | |
| 2002/0056435 A1 | 5/2002 | Yang et al. | |
| 2004/0231639 A1 | 11/2004 | Israel et al. | |
| 2013/0087111 A1* | 4/2013 | Brennan | F02D 41/22 123/90.12 |
| 2018/0274456 A1* | 9/2018 | Gunnarsson | F02D 13/0249 |
| 2018/0363567 A1* | 12/2018 | Mohlin | F02D 13/04 |
| 2020/0173378 A1* | 6/2020 | Koyasu | F02D 13/0261 |
| 2020/0200103 A1* | 6/2020 | Mohlin | F02D 9/02 |
| 2021/0025341 A1* | 1/2021 | Baltrucki | F02D 13/06 |
| 2021/0317794 A1* | 10/2021 | Wagner | F02D 13/0207 |

FOREIGN PATENT DOCUMENTS

WO 2017217908 A1 12/2017

* cited by examiner

*Primary Examiner* — Erick R Solis
(74) *Attorney, Agent, or Firm* — Moore & Van Allen PLLC; W. Kevin Ransom (57) ABSTRACT

The disclosure concerns variable valve timing of a four-stroke ICE. The ICE comprises: an exhaust valve and an intake valve an exhaust camshaft an intake camshaft and a cylinder arrangement. The cylinder arrangement comprises a combustion chamber a cylinder bore and a piston. The control arrangement is configured to: perform a first sequence of changes in the timings of the exhaust and intake camshafts in order to arrive from a first camshaft timing setting at a second camshaft timing setting based on a first current maximum cylinder pressure within the combustion chamber around top dead centre fire and/or around to dead centre gas exchange.

12 Claims, 5 Drawing Sheets

VARIABLE VALVE TIMING INTERNAL COMBUSTION ENGINE

CROSS-REFERENCE TO PRIOR APPLICATIONS

This application claims priority to Swedish Patent Application No. 2051179-6 filed Oct. 9, 2020 of the same title; the contents of which are hereby incorporated by reference.

FIELD OF THE INVENTION

The invention relates to a control arrangement for controlling a variable valve timing of a four-stroke internal combustion engine, to a four-stroke internal combustion engine comprising a control arrangement, to a vehicle comprising a four-stroke internal combustion engine, and to a method for controlling a variable valve timing of a four-stroke internal combustion engine. The invention further relates to a computer program and to a computer-readable storage medium.

BACKGROUND OF THE INVENTION

A four-stroke internal combustion engine, ICE, may for instance form a power source of a drivetrain of a vehicle. When fuel is combusted in the ICE, positive torque is provided to the drivetrain for propelling the vehicle via drive wheels of the vehicle. The drive wheels form part of the drivetrain and are configured for transmitting torque between the drivetrain and a surface, on which the vehicle is travelling.

When no fuel is combusted in the ICE while the vehicle is travelling along the surface, the momentum of the vehicle rotates the drive wheels. If under such circumstances the drivetrain is closed, i.e. when torque is transferred from the drive wheels to the ICE, the crankshaft of the ICE is rotated by the rotating drive wheels. In such a situation, the ICE may apply a negative torque, i.e. a braking torque, to the drivetrain. The application of the negative torque to the drivetrain is often referred to as engine braking. That is, the negative torque applied to the drivetrain reduces the speed of the vehicle.

The amount of negative torque applied to the drivetrain during engine braking may be increased by utilizing a compression release engine brake. The compression release engine brake may also be referred to as compression release break, CRB, or Jake brake, or Jacobs brake, or decompression brake. When activated, the CRB opens the exhaust valve after the compression stroke, releasing the compressed air to the exhaust system of the ICE. Thereby, the energy stored in the compressed air during the compression stroke will not be returned to the crankshaft on the subsequent expansion stroke. Accordingly, the negative torque of the engine is increased.

Variable valve timing, also referred to as phase shifting or cam phasing, may be utilized in an ICE to achieve a number of different effects. For instance, variable valve timing may be applied during compression release engine braking.

US 2002/056435 discloses engine braking of a reciprocating piston internal combustion engine by variable valve actuation. One embodiment of this disclosure enables independent two-valve actuation for each cylinder, and engine braking horsepower can be controlled using two-valve braking at high engine speeds and one-valve braking at low speeds. Also, a sequential valve actuation to reduce engine braking load and engine starting and warming up by controlling timing and lift of each valve are disclosed.

US 2004/231639 discloses a variable valve actuation system for providing discrete exhaust and intake valve lift profiles for various operating modes of an internal combustion engine. The variable valve actuation system includes exhaust and intake rocker assemblies, exhaust and intake hydraulic extension devices operatively coupling corresponding rocker assemblies with respective engine valves and exhaust and intake control valves for selectively supplying the pressurized hydraulic fluid to the extension devices so as to independently switch them between a pressurized condition and a depressurized condition. The engine further includes an exhaust brake provided to initiate a small lift of the exhaust valve during the engine braking operation while the exhaust extension device maintains the exhaust valve open during a compression stroke for bleeder-compression release braking. The exhaust and intake valves can be adjusted independently to provide combinations of valve lift modes.

Not only during compression release engine braking but also under other ICE operating circumstances, the use of variable valve timing and thereto related timing changes introduce high loads on engine hardware, such as a valve train, i.e. valves and/or valve actuation mechanisms, of the engine.

SUMMARY OF THE INVENTION

It would be advantageous to achieve a control arrangement and/or a method for controlling a variable valve timing of a four-stroke internal combustion engine. In particular, it would be desirable to accommodate for variable valve timing changes under current engine operating conditions. To better address one or more of these concerns, at least one of a control arrangement, a four-stroke internal combustion engine, a vehicle, and a method having the features defined in the independent claims is provided.

According to an aspect, there is provided a control arrangement for controlling a variable valve timing of a four-stroke internal combustion engine. The internal combustion engine comprises an exhaust valve and an intake valve, an exhaust camshaft arranged to control the opening of the exhaust valve, an intake camshaft arranged to control the opening and closing of the intake valve, and a cylinder arrangement. The cylinder arrangement comprises a combustion chamber, a cylinder bore, and a piston configured to reciprocate in the cylinder bore between a bottom dead center and a top dead center. The control arrangement is configured to:

perform a first sequence of changes in the timings of the exhaust and intake camshafts, in order to arrive from a first camshaft timing setting at a second camshaft timing setting based on a first current maximum cylinder pressure within the combustion chamber around top dead center fire, TDCf, and/or around top dead center gas exchange, TDCge.

According to a further aspect, there is provided a method for controlling a variable valve timing of a four-stroke internal combustion engine. The internal combustion engine comprises an exhaust valve and an intake valve, an exhaust camshaft arranged to control the opening of the exhaust valve, an intake camshaft arranged to control the opening and closing of the intake valve, and a cylinder arrangement, the cylinder arrangement comprising a combustion chamber, a cylinder bore, and a piston configured to reciprocate in the cylinder bore between a bottom dead center and a top dead center. The method comprises:

performing a first sequence of changes in the timings of the exhaust and intake camshafts, in order to arrive from a first camshaft timing setting at a second camshaft timing setting based on a first current maximum cylinder pressure within the combustion chamber around top dead center fire, TDCf, and/or around top dead center gas exchange, TDCge.

Since there is performed a first sequence of changes in the timings of the exhaust and intake camshafts in order to arrive from a first camshaft timing setting at a second camshaft timing setting, based on a first current maximum cylinder pressure within the combustion chamber around top dead center fire and/or around top dead center gas exchange, current engine operating conditions are considered when variable valve timing is changed from one camshaft timing setting to a different camshaft timing setting.

More specifically, a large number of different changes in the timings of the exhaust and intake camshafts lead from a first camshaft timing setting, wherein the intake camshaft has an angular setting of $\alpha1$ and the exhaust camshaft has an angular setting of $\beta1$, to a second camshaft timing setting, wherein the intake camshaft has an angular setting of $\alpha2$ and the exhaust camshaft has an angular setting of $\beta2$. In accordance with the present invention, current engine operating conditions, as expressed by the first current maximum cylinder pressure within the combustion chamber around top dead center fire, TDCf, of the piston and/or around top dead center gas exchange, TDCge, of the piston, dictate the first sequence of timing changes to be performed when transitioning from the first to the second camshaft timing setting. That is, the first sequence is configured to take account of the current engine operating conditions.

It has been realized by the inventors that the current maximum cylinder pressure within the combustion chamber around TDCf and/or around TDCge, may be utilized for performing a particular sequence of changes in the timings of the exhaust and intake camshafts, i.e. the first sequence of changes in the timings of the exhaust and intake camshafts. Various considerations may lead to use of the first sequence of timing changes, such as e.g. in order to avoid unfavorable engine operating states, in order to control combustion pressure, and/or in order to avoid too high valvetrain loads.

The first sequence of changes in the timings of the exhaust and intake camshafts in order to arrive from the first camshaft timing setting at the second camshaft timing setting may be determined and known in its entirety upon initiating the first sequence. Alternatively, the first sequence may be determined during its progression, continuously or intermittently based on continuously or intermittently determined current maximum cylinder pressures within the combustion chamber around TDCf and/or around TDCge.

The four-stroke internal combustion engine, ICE may be a compression ignition ICE, such as a diesel engine. Herein, the four-stroke ICE alternatively may be simply referred to as an internal combustion engine, ICE, or engine.

The ICE comprises a crankshaft connected to the piston, the exhaust camshaft, the intake camshaft, and the control arrangement. Further, the ICE comprises the cylinder arrangement and according to some embodiments a compression release brake mechanism, which are known as such. The cylinder arrangement may comprise further exhaust and/or intake valves.

As in any four-stroke ICE, the piston performs an intake stroke, a compression stroke, an expansion stroke also referred to as power stroke or combustion stroke, and an exhaust stroke in the cylinder bore of the cylinder arrangement. The compression stroke is the stroke leading up to TDCf and the exhaust stroke is the stroke leading up to TDCge.

The ICE may comprise more than one cylinder arrangement, such as e.g. four, five, six, or eight cylinder arrangements.

The exhaust camshaft is configured to control the opening and closing of the exhaust valve in a commonly known manner with a cam lobe of the exhaust camshaft controlling the exhaust valve. The intake camshaft is configured to control the opening and closing of the intake valve in a commonly known manner with a cam lobe of the intake camshaft controlling the intake valve. The intake and exhaust valves and the intake and exhaust camshafts form part of a valve train of the ICE.

The rotations of the exhaust and intake camshafts are synchronized with the rotation of the crankshaft. However, the timing of the exhaust and intake camshafts is changeable, i.e. the rotational positions of the camshafts in relation to the crankshaft are controllable. Herein, this is referred to as timing change and as variable valve timing.

In practice, this means that the crankshaft angle at which a valve controlled by the relevant camshaft is opened and closed can be changed. The changing of the timing of the camshafts may be performed in any known manner. For instance, WO 2017/217908 and U.S. Pat. No. 8,714,123 disclose suitable timing control arrangements to be utilized for changing the timing of the camshafts.

It is to be noted that an angular length of the open period of each of the exhaust and intake valves remains the same when the timings of the camshafts are changed. This, as opposed to systems where lost motion mechanisms are utilized for changing closing and/or opening positions of valves, which accordingly will also affect the angular length of the period during which the relevant valve remains open.

As mentioned above, the timings of the exhaust and intake camshafts are controllable by the control arrangement, i.e. the control arrangement is configured to change the rotational position of the camshafts in relation to the crankshaft.

A timing change angle of the respective camshaft is the angle by which the timing of the camshaft is changed from its ordinary angular operating position in relation to the crankshaft.

A sequence of changes in the timings of the exhaust and intake camshafts comprises one or more intermediate timing angle changes of the intake and/or exhaust camshaft between the first camshaft timing setting and the second camshaft timing setting. A sequence of changes in the timings of the exhaust and intake camshafts may comprise temporal separation conditions between the one or more intermediate timing angle changes and/or between the first and second camshaft timing setting, i.e. conditions affecting the time period that passes between the control arrangement changing the camshaft timing settings from the first camshaft timing setting to the second camshaft timing setting.

A sequence of changes in the timing of the exhaust and/or intake camshafts may e.g. be mapped in a table or expressed as a mathematical function.

A sequence of changes in the timing of the exhaust and/or intake camshaft may herein alternatively be referred to simply as a sequence, or as a sequence of timing changes.

A sequence of timing changes may be occasioned by operator controlled or cruise control (CC) changes of ICE operating conditions, such as e.g. by a change in torque request, a brake command, a gear change. Alternatively, or additionally, a sequence of timing changes may be occasioned by changing driving conditions of a vehicle changing ICE operating conditions of the ICE of the vehicle, such as e.g. the vehicle driving on an uphill or downhill gradient which affects ICE operating conditions. Further, a sequence of timing changes may be occasioned by changes in ambient conditions of the ICE, which affect ICE operating conditions, such as e.g. a change in charge air temperature. Naturally, these different changes in ICE operating conditions may be interrelated in various ways.

The term maximum cylinder pressure relates to the maximum pressure within the combustion chamber and encompasses compression pressure alone as well as combustion pressure. That is, during operation of the ICE without combustion of fuel in the combustion chamber the maximum cylinder pressure corresponds to the maximum compression pressure and during operation of the ICE with combustion of fuel in the combustion chamber the maximum cylinder pressure corresponds to the maximum combustion pressure (maximum compression pressure+pressure caused by combusting fuel).

The term "around" in the context of the current maximum cylinder pressure within the combustion chamber around top dead center fire, TDCf, and/or around top dead center gas exchange, TDCge, may refer to the maximum cylinder pressure occurring within a range of 0-80 degrees C.A centered at TDCf or TDCge, i.e. 0-40 degrees C.A before and after TDCf or TDCge. This range incorporates the ICE operating without fuel injection (the ICE being driven by the driving wheels of the vehicle), the ICE operating with fuel injection, as well as compression release braking of the ICE. To elaborate further, ICE operating without fuel injection may cause the maximum cylinder pressure to occur within a range of 0-2 degrees C.A before TDCf, and/or within a range of 0-20 degrees before TDCge. The ICE operating with fuel injection may cause the maximum cylinder pressure to occur within a range of 0-20 degrees C.A before TDCf and 0-20 degrees C.A after TDCf, and the ICE operating with compression release braking may cause the maximum cylinder pressure to occur within a range of 0-40 degrees C.A before TDCf or TDCge.

Changes in ICE operating conditions may be of a gradual character or of a transient character. A sequence of timing changes may be performed in response to, or during, a transient change or a gradual change in ICE operating conditions. By performing the first sequence based on the first current maximum cylinder pressure, the timing changes of the camshafts may take account of the character (transient, gradual) of changes in the ICE operating condition.

The current maximum cylinder pressure provides an indication of conditions in the combustion chamber of the ICE and an available margin to a limit cylinder pressure, at which the ICE may be damaged and/or operate poorly. While avoiding ICE damage or poor ICE operation, a sequence of timing changes may be selected depending on an operating situation of the ICE, with the maximum cylinder pressure during the sequence either close to the limit cylinder pressure or at safer distance from the limit pressure.

According to embodiments, the control arrangement may be configured to:

perform a second sequence of changes in the timings of the exhaust and intake camshafts in order to arrive from the first camshaft timing setting at the second camshaft timing setting based on a second current maximum cylinder pressure within the combustion chamber around TDCf and/or around TDCge. The second current maximum cylinder pressure differs from the first current maximum cylinder pressure, and the second sequence of changes in the timings of the exhaust and intake camshafts differs from the first sequence of changes in the timings of the exhaust and intake camshafts. In this manner, depending on whether the first or the second current maximum cylinder pressure within the combustion chamber around TDCf and/or around TDCge prevails, either the first or the second sequence of changes in the timings of the exhaust and intake camshafts may be performed. Accordingly, depending on currently prevailing engine operating conditions as defined by the first or second current maximum cylinder pressure within the combustion chamber around TDCf and/or around TDCge, a for the current conditions suitable sequence of changes in the timings of the exhaust and intake camshafts, i.e. the first or the second sequence, may be performed.

The second sequence may differ from the first sequence by the number and/or order of intermediate timing angle changes of the intake and/or exhaust camshaft. Alternatively, or additionally, the second sequence may differ from the first sequence by the size of one or more of the intermediate timing angle changes of the intake and/or exhaust camshaft. Alternatively, or additionally, the second sequence may differ from the first sequence by temporal separation conditions between one or more of the intermediate timing angle changes.

Similarly to the first sequence, the second sequence of changes in the timings of the exhaust and intake camshafts in order to arrive from the first camshaft timing setting at the second camshaft timing setting may be determined and known in its entirety upon initiating the second sequence. Alternatively, the second sequence may be determined during its progression, continuously or intermittently based in continuously or intermittently determined current maximum cylinder pressures within the combustion chamber around TDCf and/or around TDCge.

Similarly to the first current maximum cylinder pressure within the combustion chamber around TDCf and/or around TDCge, the second current maximum cylinder pressure within the combustion chamber around TDCf and/or around TDCge may be determined utilizing a pressure sensor, and/or the second current maximum cylinder pressure may be calculated or estimated based on a model of the ICE.

According to embodiments, the second sequence of changes in the timings of the exhaust and intake camshafts may differ from the first sequence of changes in the timings of the exhaust and intake camshafts by number, and/or order, and/or size of timing change angles of the exhaust and/or intake camshafts. In this manner, the first and second sequences may differ from each other.

According to embodiments, a first time period may be utilized to perform the first sequence of changes in the timings of the exhaust and intake camshafts in order to arrive from the first camshaft timing setting at the second camshaft timing setting and a second time period may be utilized to perform the second sequence of changes in the timings of the exhaust and intake camshafts in order to arrive from the first camshaft timing setting at the second camshaft timing setting. The first time period differs from the second time period. In this manner, the first sequence may differ from the second sequence by the time period it takes to perform the respective first and second sequences. For instance, under certain conditions, different temporal separation conditions between one or more intermediate timing angle changes and/or between the first and second camshaft timing settings of the first and second sequences of timing changes may be sufficient, e.g. in order to avoid unfavorable engine operating states.

According to embodiments, the exhaust camshaft may be further arranged to control compression release braking of the internal combustion engine. The control arrangement may be configured, upon or during compression release brake activation, to:

perform the first sequence of changes in the timings of the exhaust and intake camshafts, based on the first current maximum cylinder pressure. In this manner, during compression release braking, in the transition from the first camshaft timing setting to the second camshaft timing setting, the load on the valvetrain of the ICE may be controlled following the first sequence of timing changes.

In such embodiments, the ICE comprises a compression release brake mechanism, which is known as such. In a known manner, the exhaust camshaft is arranged to control compression release braking of the ICE via the compression release brake mechanism. For this purpose, the exhaust camshaft may comprise one or more further cam lobes, which cause the exhaust valve to open via the compression release brake mechanism when compression release braking is activated.

During compression release braking without timing change of the exhaust camshaft, the compression release brake mechanism causes the exhaust valve to open at the beginning of the expansion stroke. That is, without any timing change of the exhaust camshaft, the compressed air in the combustion chamber is released into the exhaust system of the engine around TDCf of the piston.

The timing change of the exhaust camshaft during compression release braking affects both the ordinary cam lobe of the exhaust camshaft and the one or more further cam lobes of the exhaust camshaft.

The control arrangement may be configured, upon receiving an engine braking torque request, or upon producing a requested engine braking torque, to activate compression release braking.

Engine braking torque, braking torque, negative torque, requested engine braking torque, engine braking torque request, etc. discussed herein relate to braking torque produced by the ICE during engine braking without or with compression release braking.

According to embodiments, the four-stroke internal combustion engine may comprise a turbocharger configured to produce a charge air pressure, and the control arrangement may be configured to:

change the charge air pressure provided by the turbocharger, based on the first current maximum cylinder pressure. In this manner, the charge air pressure may be adapted to current ICE operating conditions. For instance, a so-called wastegate or a throttle downstream of the exhaust valve may reduce the flow of exhaust gas through a turbine of the turbocharger thus, reducing the charge air pressure produced by a compressor of the turbocharger. Simultaneously or subsequently, the first or second sequence of changes in the timings of the exhaust and intake camshafts may be performed.

According to a further aspect there is provided a four-stroke internal combustion engine comprising a control arrangement according to any one of aspects and/or embodiments discussed herein.

According to a further aspect there is provided a vehicle comprising a four-stroke internal combustion engine according to any one of aspects and/or embodiments discussed herein.

According to a further aspect there is provided a computer program comprising instructions which, when the program is executed by a computer, cause the computer to carry out the method according to any one of aspects and/or embodiments discussed herein.

According to a further aspect there is provided a computer-readable storage medium comprising instructions which, when executed by a computer, cause the computer to carry out the method according to any one of aspects and/or embodiments discussed herein.

Further features and advantages will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which:

FIG. 3 illustrates a control arrangement,
FIGS. 4a and 4b schematically illustrate diagrams over timing change angles of intake and exhaust camshafts.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
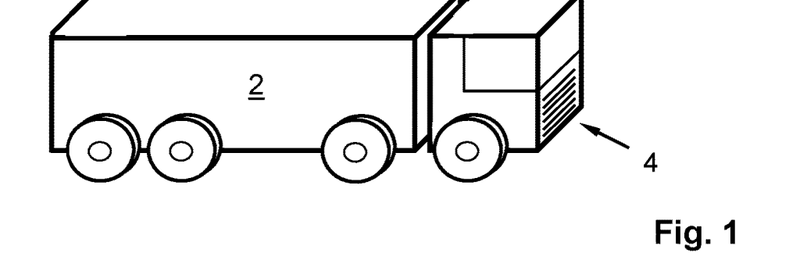
FIG. 1 illustrates embodiments of a vehicle,
FIG. 2 schematically illustrates embodiments of an ICE.

FIG. 1 illustrates embodiments of a vehicle 2 configured for land-based propulsion. The vehicle 2 comprises a four-stroke internal combustion engine, ICE, 4 according to aspects and/or embodiments discussed herein, such as e.g. the ICE discussed below with reference to FIG. 2. The ICE 4 comprises a control arrangement, as discussed below with reference to FIGS. 2-5. A method as discussed with reference to FIG. 6 may be utilized for controlling the ICE 4.

In these embodiments, the vehicle 2 is a heavy load vehicle in the form of a truck. However, the invention is not limited to any particular type of vehicle configured for land-based propulsion.

Figure 2:
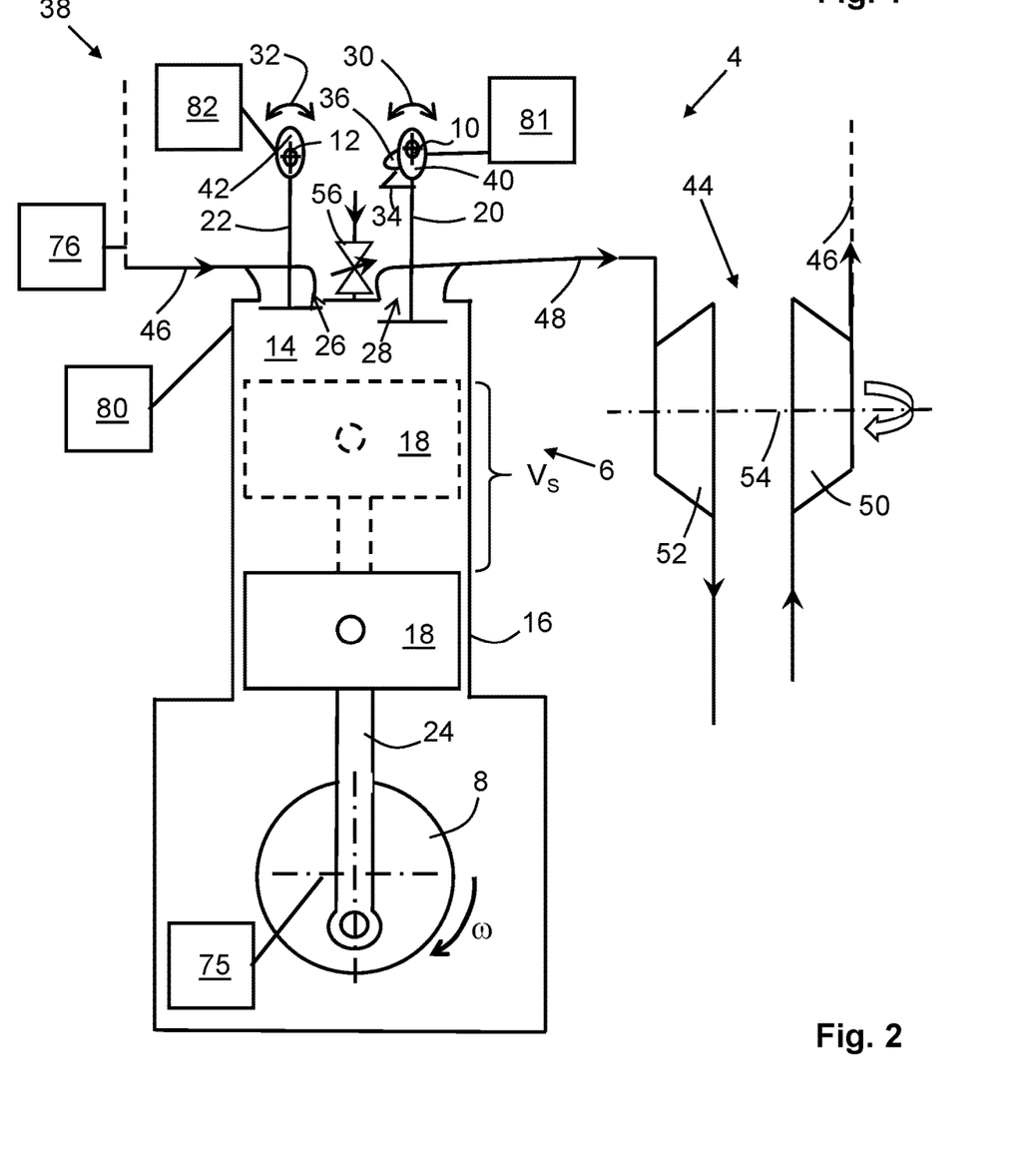

FIG. 2 schematically illustrates embodiments of an ICE 4. The ICE 4 may be configured to form part of a powertrain of a vehicle, such as e.g. the vehicle 2 shown in FIG. 1.

The ICE 4 is a four-stroke direct injection internal combustion engine, such as a compression ignition ICE 4, e.g. a diesel engine. The ICE 4 comprises at least one cylinder arrangement 6, a crankshaft 8, an exhaust camshaft 10, an intake camshaft 12, an exhaust valve 20, and an intake valve 22.

The cylinder arrangement 6 comprises a combustion chamber 14, a cylinder bore 16, and a piston 18 configured to reciprocate in the cylinder bore 16. The piston 18 is connected to the crankshaft 8 via a connecting rod 24.

The movement of the exhaust valve 20 is controlled by the exhaust camshaft 10, i.e. the exhaust camshaft 10 is configured to control the opening and closing of the exhaust valve 20. The movement of the intake valve 22 is controlled by the intake camshaft 12, i.e. the intake camshaft 12 is configured to control the opening and closing of the intake valve 22.

The intake valve 22 is configured for admitting charge air into the combustion chamber 14, and the exhaust valve 20 is configured for letting exhaust gas out of the combustion chamber 14. The timing of the exhaust camshaft 10 is configured to the be controlled by a timing control arrangement 30 as indicated by a double arrow. Similarly, the timing of the intake camshaft 12 is configured to be controlled by a timing control arrangement 32 as indicated by a double arrow.

In a known manner, the intake valve 22 comprises an intake valve head configured to seal against an intake valve seat extending around an intake opening 26. The exhaust valve 20 comprises an exhaust valve head configured to seal against an exhaust valve seat extending around an exhaust opening 28.

In a known manner, the camshafts 10, 12 may rotate at half the rotational speed of the crankshaft 8 and control the movement of the exhaust and intake valves 20, 22 via cam lobes 40, 42 arranged on the camshafts 10, 12. The exhaust camshaft 10 is arranged for controlling movement of the exhaust valve 20, and opening and closing of the exhaust opening 28. The exhaust camshaft 10 comprises a cam lobe 40. For instance, by abutting against the cam lobe 40, the exhaust valve 20 will follow a contour of the cam lobe 40. The exhaust valve 20 may be biased towards its closed position, e.g. by means of a non-shown spring. The movement of the intake valve 22 is controlled in a corresponding manner by the intake camshaft 12 and its cam lobe 42 for opening and closing the intake opening 26.

The cylinder arrangement 6 may comprise more than one intake and/or exhaust valve. Also such additional valves may be controlled in the manner discussed herein.

The piston 18 is arranged to reciprocate in the cylinder bore 16 between a bottom dead center, BDC, and a top dead center, TDC. The piston 18 performs four strokes in the cylinder bore 16, corresponding to an intake stroke, a compression stroke, an expansion or power stroke, and an exhaust stroke, see also FIG. 5. In FIG. 2 the piston 18 is illustrated with continuous lines at its BDC and with broken lines at its TDC. The combustion chamber 14 is formed above the piston 18 inside the cylinder bore 16.

The cylinder arrangement 6 has a total swept volume, Vs, in the cylinder bore 16 between the BDC and the TDC. According to some embodiments, the cylinder arrangement 6 may have a total swept volume, Vs, of within a range of 0.3 to 4 litres. Mentioned purely as an example, in the lower range of Vs, the cylinder arrangement 6 may form part of an internal combustion engine for a passenger car, and in the middle and higher range of Vs, the cylinder arrangement 6 may form part of an internal combustion engine for a heavy load vehicle such as e.g. a truck, a bus, or a construction vehicle.

According to some embodiments, the ICE 4 may comprise a compression release brake mechanism 34. In such embodiments, the exhaust camshaft 10 is configured to control compression release braking, CRB. For this purpose, the exhaust camshaft 10 comprises one or more dedicated lobes 36. Upon activation of compression release braking, the one or more lobes 36 engage with the compression release brake mechanism 34 to control opening and closing of the exhaust valve 20. CRB produces a negative torque, or braking torque, which may be utilized for retarding the vehicle. When compression release braking is deactivated, the compression release brake mechanism 34 does not affect the exhaust valve 20.

The ICE 4 comprises a turbocharger 44. The turbocharger 44 comprises a compressor 50 and a turbine 52. The compressor 50 and the turbine 52 of the turbocharger 44 are connected via a common shaft 54. An inlet conduit 46 for charge air, leads from the compressor 50 to the intake opening 26. For the sake of clarity, the inlet conduit 46 is not shown in its entirety. An exhaust conduit 48 leads from the exhaust opening 28 to the turbine 52. The turbocharger 44 produces a charge air pressure in the inlet conduit 46 and at the intake valve 22. More specifically, the gas discharged via the exhaust valve 20 drives the turbine 52, which in turn rotates the compressor 50. Thus, the compressor 50 provides charge air at a charge air pressure to the intake valve 22. The turbocharger 44 may comprise a wastegate (not shown), through which part of a gas flow from the exhaust valve may selectively bypass the turbine 52.

The ICE 4 comprises a fuel injector 56 configured for injecting fuel into the combustion chamber 14 when the ICE 4 produces positive torque, e.g. for propelling the vehicle.

The ICE 4 further comprises a control arrangement 38 according to aspects and/or embodiments discussed herein. The control arrangement 38 is configured for controlling variable valve timing of the ICE 4. That is, the control arrangement 38 is configured at least for controlling the timing of the exhaust camshaft 10 and the timing of the intake camshaft 12. Accordingly, the timing control arrangements 30, 32 form part of the control arrangement 38.

The control arrangement 38 is configured to:

perform a first sequence S1 of changes in the timings of the exhaust and intake camshafts 10, 12 in order to arrive from a first camshaft timing setting $\beta1$, $\alpha1$ at a second camshaft timing setting $\beta2$, $\alpha2$, based on a first current maximum cylinder pressure within the combustion chamber 14 around top dead center fire, TDCf, and/or around top dead center gas exchange, TDCge of the piston 18.

The control arrangement 38 and the timing changes of the camshafts 10, 12 are further discussed below with reference to FIGS. 3-5.

Figure 3:
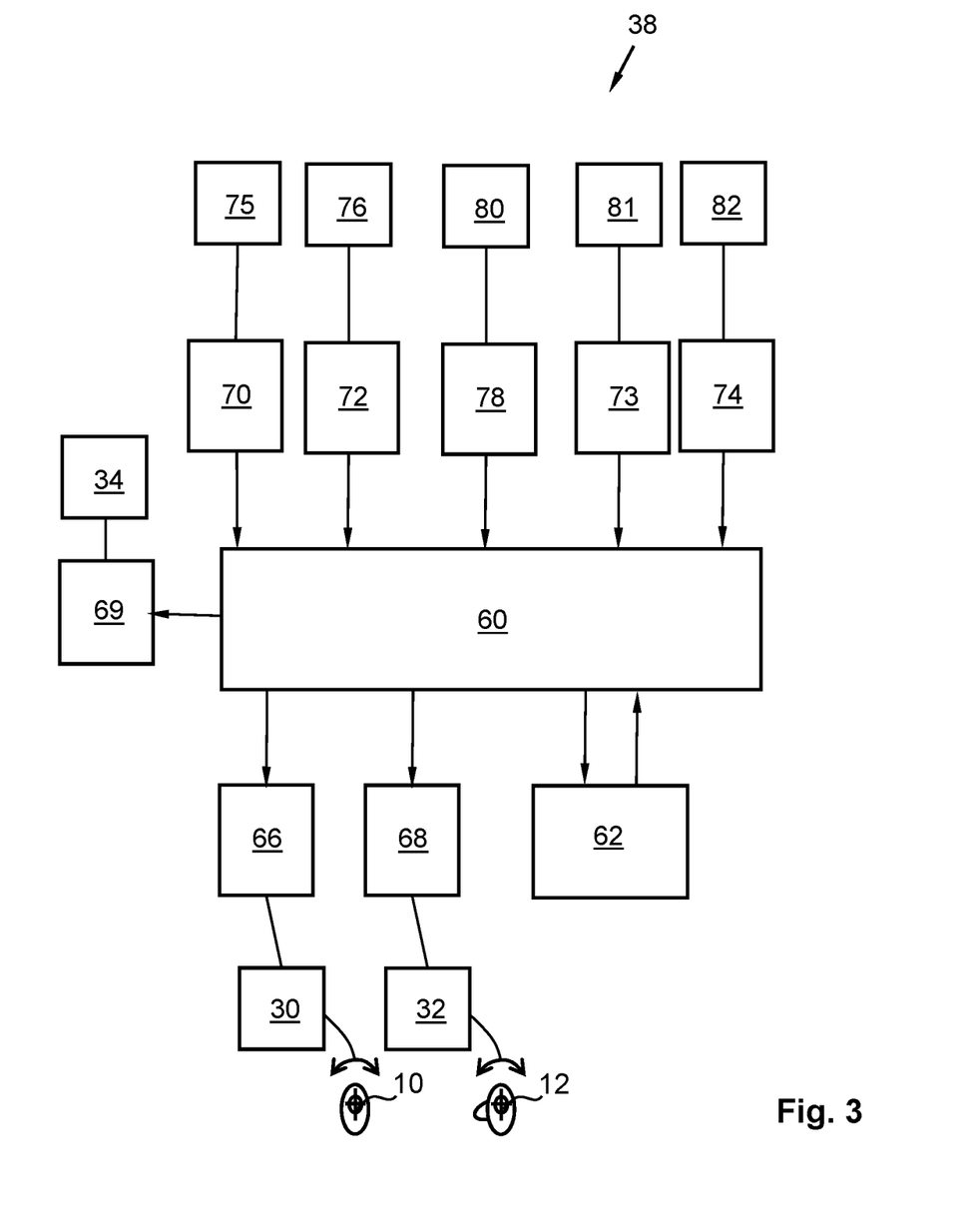

FIG. 3 illustrates a control arrangement 38 to be utilized in connection with different aspects and/or embodiments of the invention. In particular, the control arrangement 38 is configured for the control of the timing of the camshafts 10, 12 of the ICE 4 discussed in connection with FIGS. 1 and 2. The control arrangement 38 is also indicated in FIG. 2. Accordingly, in the following reference is also made to FIG. 2.

The control arrangement 38 comprises at least one calculation unit 60, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilized expression "calculation unit" may represent a processing circuitry comprising a plurality of processing circuits, such as one or more of the ones mentioned above. The calculation unit 60 may be configured to perform calculations.

The control arrangement 38 comprises a memory unit 62. The calculation unit 60 is connected to the memory unit 62, which provides the calculation unit 60 with, e.g. stored programme code, data tables, and/or other stored data which the calculation unit 60 needs to enable it to do calculations and to control at least some functions of the ICE 4, such as the timing changes of the exhaust and intake camshafts 10, 12. The calculation unit 60 is also adapted to store partial or final results of calculations in the memory unit 62. The memory unit 62 may comprise a physical device utilized to store data or programs, i.e. sequences of instructions on a temporary or permanent basis. According to some embodiments, the memory unit 62 may comprise integrated circuits comprising silicon-based transistors. The memory unit 62 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 38 is further provided with respective devices 70, 72, 73, 74, 78, 66, 68, 69 for receiving and/or sending input and output signals. These input and output signals may comprise waveforms, pulses or other attributes, which can be detect as information by signal receiving devices, and which can be converted to signals processable by the calculation unit 60. Input signals are supplied to the calculation unit 60 from the input receiving devices 70, 72, 73, 74, 78. Output signal sending devices 66, 68, 69 are arranged to convert calculation results from the calculation unit 60 to output signals for conveying to signal receiving devices of other parts of the control arrangement 38. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, only one calculation unit 60 and memory unit 62 are shown, but the control arrangement 38 may alternatively comprise more than one calculation unit and/or memory unit.

Mentioned as examples, the output signal sending devices 66, 68, 69 may send control signals to the timing control arrangements 30, 32 of the exhaust and intake camshafts 10, 12, and the compression release brake mechanism 34. The input signal receiving devices 70, 72, 73, 74, 78 may receive signals from the ICE 4, such as e.g. from a rotational speed sensor 75 of the crankshaft 8 of the ICE 4, a charge air pressure sensor 76, a rotational speed sensor 81 of the exhaust camshaft 10, a rotational speed sensor 82 of the intake camshaft 12, and a cylinder pressure sensor 80. The control arrangement 38 may comprise further sensors, e.g. for providing data for calculating and/or estimating the maximum cylinder pressure.

Examples of data tables may be e.g.;

one or more tables containing alternative sequences of timing change angles of the exhaust and intake camshafts 10, 12, one or more tables containing ICE rotational speed mapped with braking torque values at different charge air pressures or within different charge air pressure ranges, one or more tables containing timing angles of the exhaust and intake camshafts 10, 12 at different engine operating states, which timing angles might cause erratic engine operation or damage hardware of the ICE 4.

Examples of data may be measured, monitored, determined, and/or calculated data, such as current maximum cylinder pressure within the combustion chamber 14 around TDCf, and/or around TDCge, rotational speed data, charge air pressure data, charge air temperature, timing change angle data. Data may also relate to ICE geometry, e.g. for the purpose of calculating valvetrain load. The control arrangement 38 comprises or is connected to various sensors and actuators in order to receive input and provide output for performing the various aspects and embodiments of the method discussed herein. Some of the various sensors are exemplified above. An example of actuators may be actuators configured for changing the timing of the camshafts 10, 12 and forming part of the timing control arrangements 30, 32.

The control arrangement 38 may be configured to perform a method 100 according to any one of aspects and/or embodiments discussed herein, see e.g. below with reference to FIG. 6.

Figure 4A:
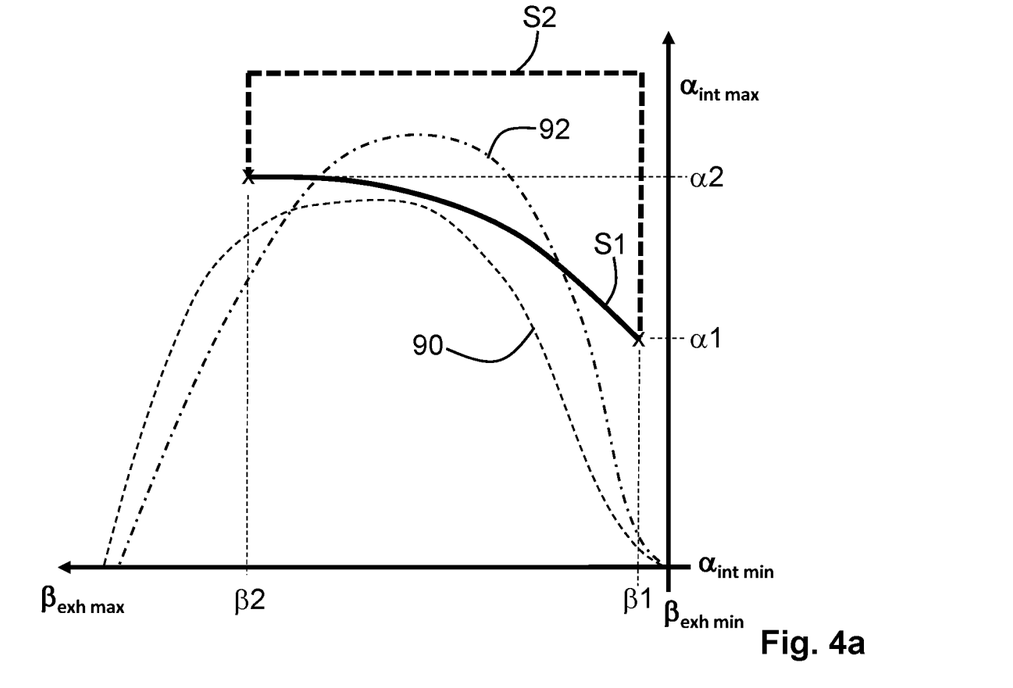
Figure 4B:
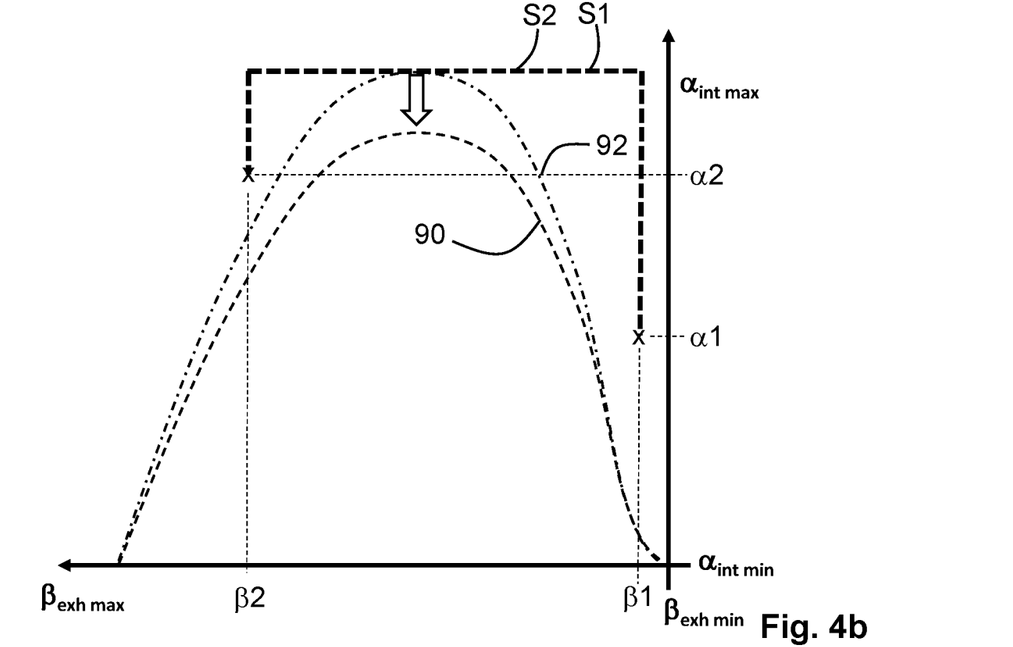

FIGS. 4a and 4b schematically illustrate diagrams over timing change angles of intake and exhaust camshafts. In the following reference is also made to FIGS. 1-5.

Each of the diagrams of FIGS. 4a and 4b shows a coordinate system representing the timing change angle of the exhaust camshaft, $\beta_{exh}$, along the X-axis and timing change angle of the intake camshaft, $\alpha_{int}$, along the Y-axis. Herein, reference is made to crankshaft angle degrees, CA degrees, e.g. when discussing timing changes of the camshafts. One full rotation of the crankshaft is 360 CA degrees. Crankshaft angle may be measured e.g. from TDCf or TDCge. Negative timing change angles related to advancing the opening and closing of a relevant valve and in the discussed examples typically applies to the exhaust camshaft. Positive timing change angles related to delaying the opening and closing of a relevant valve and in the discussed examples typically applies to the intake camshaft.

As mentioned above, the control arrangement 38 is configured to:

perform a first sequence S1 of changes in the timings of the exhaust and intake camshafts 10, 12 in order to arrive from a first camshaft timing setting β1, α1 at a second camshaft timing setting β2, α2. The first sequence S1 is based on a first current maximum cylinder pressure within the combustion chamber 14 around TDCf, and/or around TDCge of the piston 18.

Under different operating conditions of the ICE 4, when a second current maximum cylinder pressure prevails within the combustion chamber 14, different from the first current maximum cylinder pressure, the control arrangement 38 may be configured to:

perform a second sequence S2 of changes in the timings of the exhaust and intake camshafts 10, 12 in order to arrive from the first camshaft timing setting β1, a1 at the second camshaft timing setting β2, α2, based on the second current maximum cylinder pressure within the combustion chamber around TDCf and/or around TDCge of the piston 18. The second sequence S2 of changes in timings differs from the first sequence S1 of changes in timings.

The first and second sequences S1, S2 of timing changes may be performed in response to, or in anticipation of, changing engine operating conditions of the ICE 4, in which the ICE 4 is to operate with the second camshaft timing setting β2, α2 instead of with the first camshaft timing setting β1, α1. The changing or anticipated engine operating conditions may produce positive torque, produce zero torque, or produce negative torque without or with compression release braking. The current maximum cylinder pressure affects the choice between the first sequence S1 and the second sequence S2.

Mentioning a few examples:

The choice of the first or second sequence S1, S2 may be made, e.g. in order to avoid damage to the ICE 4, such as damage caused by too high valvetrain loads, e.g. on the exhaust valvetrain during compression release braking or on the intake valvetrain during heat producing operation of the ICE when the closing of the exhaust valve is advanced. Based on the relevant current maximum cylinder pressure, the first or second sequence S1, S2 may be selected to avoid damage to the valve trains of the ICE 4.

The choice of the first or second sequence S1, S2 may be made, e.g. in order to avoid damage to the ICE 4, such as damage caused by too high cylinder pressure. Based on the relevant current maximum cylinder pressure, the first or second sequence S1, S2 may be selected to avoid too high a cylinder pressure.

The choice of the first or second sequence S1, S2 may be made to ensure an as quick as possible transition from the first camshaft timing setting β1, α1 to the second camshaft timing setting β2, α2. Based on the relevant current maximum cylinder pressure, the first or second sequence S1, S2 may be selected to ensure a speedy transition.

The choice of the first or second sequence S1, S2 may be made to ensure a certain minimum charge air pressure provided by the turbocharger 44, e.g. in order to achieve a desired braking torque during engine braking, or to ensure that a maximum charge air pressure is not exceeded, e.g. during compression release braking. Based on the relevant current maximum cylinder pressure, the first or second sequence S1, S2 may be selected to ensure a certain charge air pressure level.

Along the first and second sequence S1, S2, different loads are put on the valvetrain of the ICE 4. There are also certain combinations of intake and exhaust timing change angles that may put damaging loads on the hardware of the ICE 4, such as on the valvetrain.

In the example of FIG. 4a, the first sequence S1 is represented by a bold line and the second sequence S2 is represented by a bold broken line.

The choice between the first and second sequences S1 and S2 may depend on different engine operating conditions, e.g. during compression release braking. During compression release braking, certain combinations of intake and exhaust timing change angles may put damaging loads on the ICE 4, such as e.g. on the compression release brake mechanism 34. In the diagram of FIG. 4a, such damaging combinations of intake and exhaust timing change angles are indicated by the broken line 90 and the dash-dotted line 92. That is, damaging combinations of the timing change angles are combinations below the broken and dash-dotted lines 90, 92, respectively. The extension of the broken and dash-dotted lines 90, 92 depend on engine operating conditions. The engine operating conditions are indicated by the first and second maximum current maximum cylinder pressures.

As can be seen in FIG. 4a, the first sequence S1 avoids the area below the broken line 90. Accordingly, the first sequence S1 is selected based on the first current maximum cylinder pressure and provides timing changes of the camshafts 10, 12, which do not put damaging loads on the ICE 4. If however, operating conditions of the ICE 4 result in the second current maximum cylinder pressure, the damaging combinations of timing change angles are instead indicated by the dash-dotted line 92. In such case, the first sequence S1 of timing changes would include ICE damaging combinations of timing change angles. Accordingly, based on the second current maximum cylinder pressure, the second sequence S2 of timing changes is instead selected and the damaging timing change angle combinations are avoided.

Accordingly, in the example of FIG. 4a, the second sequence S2 of changes in the timings of the exhaust and intake camshafts 10, 12 may differ from the first sequence S1 of changes in the timings of the exhaust and intake camshafts 10, 12 by number, and/or order, and/or size of timing change angles of the exhaust and/or intake camshafts 10, 12.

Also under other engine operating conditions than compression release braking, the second sequence S2 may differ from the first sequence S1 by number, and/or order, and/or size of timing change angles of the exhaust and/or intake camshafts 10, 12. For instance, the choice between the first and second sequence S1, S2 may be made in order to avoid too high a combustion pressure within the combustion chamber 14 during the transition from the first camshaft timing setting β1, α1 to the second camshaft timing setting β2, α2.

In the example of FIG. 4b, both the first and second sequence S1, S2 are represented by a bold broken line. As above, the extension of the broken and dash-dotted lines 90, 92 indicating ICE 4 damaging combinations of timing changes of the camshafts, which depend on engine operating conditions. Again, the engine operating conditions are indicated by the first and second maximum current maximum cylinder pressures.

The first sequence S1 avoids the area below the broken line 90. Accordingly, the first sequence S1 is selected based on the first current maximum cylinder pressure and provides timing changes of the camshafts 10, 12, which do not put damaging loads on the ICE 4.

The dash-dotted line 92 indicates damaging timing change angle combinations at the initiation of the second sequence S2 at the first camshaft timing setting β1, α1, as indicated by the second current maximum cylinder pressure. As can be seen in FIG. 4b, the dash-dotted line 92 reaches a maximum of the available intake camshaft 12 timing change range, $\alpha_{int\ max}$. Performing the first sequence S1 would have risked damaging the ICE 4. Instead, the second sequence S2 is performed. The second sequence S2 differs from the first sequence S1 by the time period used for performing the second sequence S2 but has the same extension as the first sequence S1.

The second sequence S2 takes longer time to perform than the first sequence S1. Thus, during the second sequence S2, the damaging timing change angle combinations will have time to shift and the extension of the area indicated by the dash-dotted line 92 will be reduced as indicated by the arrow at the top of the dash-dotted line 92. Thus, as the second sequence S2 progresses, once it reaches the section where the dash-dotted line 92 reached the maximum of the available intake camshaft 12 timing change range, $\alpha_{int\ max}$ at the initiation of the second sequence S2, the second sequence S2 may progress to the second camshaft timing setting β2, α2, without damaging the ICE 4. Thus, the temporal conditions of the first and second sequences S1, S2 differ from each other.

Put differently, a first time period is utilized to perform the first sequence of changes in the timings of the exhaust and intake camshafts 10, 12 in order to arrive from the first camshaft timing setting β1, α1 at the second camshaft timing setting β2, α2. A second time period is utilized to perform the second sequence S2 of changes in the timings of the exhaust and intake camshafts 10, 12 in order to arrive from the first camshaft timing setting β1, α1 at the second camshaft timing setting β2, α2. The first time period differs from the second time period.

Also under other engine operating conditions than compression release braking, the second sequence S2 may differ from the first sequence S1 by the time period utilized to perform the timing changes of the exhaust and/or intake camshafts 10, 12, e.g. in order to avoid too high a combustion pressure as mentioned above in connection with FIG. 4a.

Referring to both FIGS. 4a and 4b, the extension and/or duration of each of the first and second sequences S1, S2 may be selected prior to or upon initiation of the respective sequence S1, S2. As a precaution, during the respective sequence S1, S2, the current cylinder pressure may be measured or calculated in order to verify that the respective sequence S1, S2 does not lead to problems.

Alternatively, the extension and/or duration of each of the first and second sequences S1, S2 may be determined continuously or intermittently during the course of the respective sequence S1, S2 based on the current maximum cylinder pressure measured or calculated during the course of the respective sequence S1, S2. Thus, each of the first and second sequence S1, S2 may be adapted to current ICE operating conditions during the relevant sequence S1, S2.

The control system 38 may utilize further information about operating conditions of the ICE 4 and/or of the vehicle 2 in order to determine the respective sequence S1, S2, such as one or more of e.g. the torque provided by, or requested from, the ICE 4, whether compression release braking is activated during engine braking or not, gear changes, speed of the vehicle 2, traveling conditions of the vehicle 2, etc.

According to embodiments, the timing change angle of the intake camshaft 12 to delay opening of the intake valve 22 may be at least within a range of 0.1-40 degrees C.A, or at least within a range of 0.1-60 degrees C.A, or at least within a range of 0.1-90 degrees C.A.

According to embodiments, the timing change angle of the exhaust camshaft 10 to advance closing of the exhaust valve 20 may be at least within a range of −0.1--40 degrees C.A, or at least within a range of −0.1--60 degrees C.A, or at least within a range of −0.1--90 degrees C.A.

Mentioned purely as an example, in the diagrams of FIGS. 4a and 4b the Y-axis may be graded from a minimum intake camshaft timing change angle, $\alpha_{int\ min}$, e.g. 0 CA degrees to a maximum intake camshaft timing change, $\alpha_{int\ max}$, e.g. 80 CA degrees. The X-axis may be graded from a minimum exhaust camshaft timing change angle, $\beta_{exh\ min}$, e.g. 0 CA degrees to a maximum exhaust camshaft timing change angle, $\beta_{exh\ max}$, e.g. −80 CA degrees.

The current maximum cylinder pressure within the combustion chamber around TDCf and/or around TDCge may be determined utilizing a pressure sensor 80 forming part of the control system 38. Alternatively, or additionally, the current maximum cylinder pressure may be calculated or estimated based on a model of the ICE. Various methods for calculation/estimation of cylinder pressure are known to the skilled person. Generally, utilizing ICE geometry crankshaft angle and position of the piston, and charge air pressure, the pressure can be calculated e.g. at intake valve closing and/or exhaust valve opening. Thereafter, the cylinder pressure is calculated via thermodynamic relationships. A heat loss model and one or more mass flow models may be applied. Parameters such as trapped mass, residual gas, temperature, amount of fuel, may be considered. Sensors such as crankshaft and/or camshaft position sensors, temperature sensors, pressure sensors, and/or fuel amount sensor forming part of the control arrangement 38 may be utilized to provide data for the calculation/estimation of the cylinder pressure. Applicable principles, methods, and models are discussed in handbooks within the field of ICEs such as e.g. in Internal Combustion Engine Fundamentals by John B. Heywood, Combustion Engines by Bengt Johansson, etc.

The current maximum cylinder pressure within the combustion chamber around TDCf may be a relevant parameter to be considered e.g. during engine braking. The current maximum cylinder pressure within the combustion chamber around TDCf as well as around TDCge may be a relevant parameter to be considered e.g. during ICE operating situations when fuel is injected into the combustion chamber.

Elaborating further on the subject of compression release braking, as discussed above, the exhaust camshaft 10 may be arranged to control compression release braking of the internal combustion engine 4. Further, the control arrangement 38 may be configured, upon receiving an engine braking torque request, or upon producing a requested engine braking torque, to activate compression release braking.

Thus, the control arrangement 38 may be configured, upon or during compression release brake activation, to:

perform the first sequence S1 of changes in the timings of the exhaust and intake camshafts 10, 12 based on the first current maximum cylinder pressure.

According to embodiments wherein the control arrangement 38 is configured to:

perform a second sequence S2 of timing changes, the control arrangement 38 may be configured, upon or during compression release brake activation, to:

perform the second sequence S2 of changes in the timings of the exhaust and intake camshafts 10, 12 based on the second current maximum cylinder pressure.

Thus, during compression release braking, in the transition from the first camshaft timing setting β1, α1 to the second camshaft timing setting β2, α2 the load on the valve train of the ICE may be controlled following either the first or the second sequence of timing changes based on the respective first or second current maximum cylinder pressure. Accordingly, the current engine operating conditions, determined by the first or second current maximum cylinder pressure, may dictate the particular sequence of timing changes used during compression release braking, e.g. in order to avoid damaging loads on the valvetrain of the ICE 4.

As mentioned above, the ICE 4 may comprise a turbocharger 44 configured to produce a charge air pressure. The control arrangement 38 may be configured to:

change the charge air pressure provided by the turbocharger 44, based on the first current maximum cylinder pressure.

As mentioned above, the turbocharger 44 may comprise a wastegate, through which part of a gas flow from the exhaust valve may selectively bypass the turbine 52. Thus, the charge air pressure may be reduced by opening the wastegate based on the first current maximum cylinder pressure, in addition to preforming the first sequence S1. Alternatively, there may be provided a throttle (not shown) in the exhaust conduit 48. Thus, the charge air pressure may be reduced by closing the throttle based on the first current maximum cylinder pressure, in addition to preforming the first sequence S1.

The wastegate may be opened or the throttle may be closed for instance, if the damaging combinations of timing change angles reaches a maximum of the available timing change range of one or both of the camshafts 10, 12, as indicated by the dash-dotted line 92 in FIG. 4b.

Figure 5:
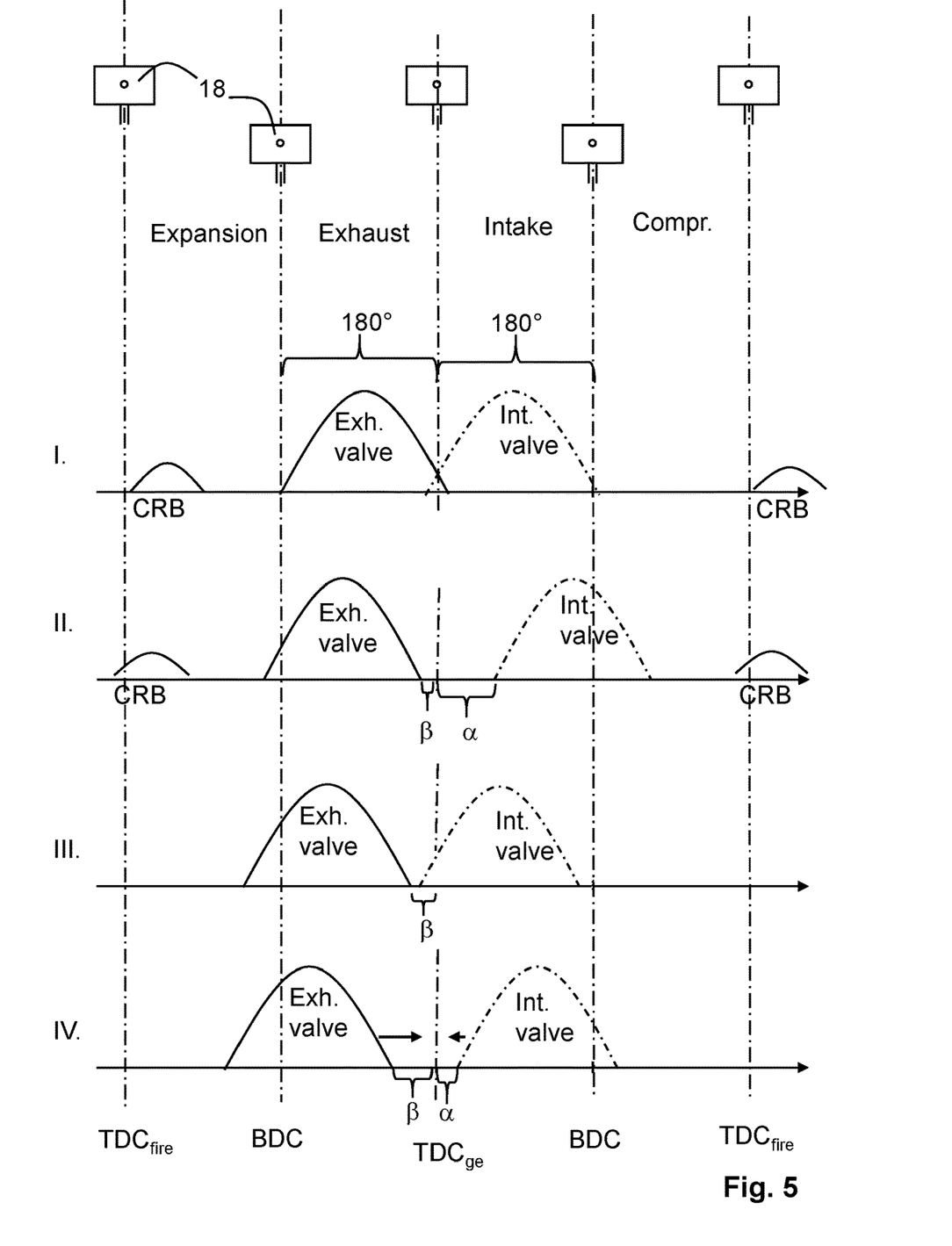
FIG. 5 illustrates diagrams over an ICE.

FIG. 5 illustrates diagrams over the ICE 4 of FIG. 2, and a few examples of control thereof in accordance with the discussion above with reference to FIGS. 2-4b. Accordingly, in the following reference is also made to FIGS. 2-4b.

FIG. 5 illustrates the four strokes of a piston 18 and the movements of the exhaust valve 20 (full line) and of the intake valve 22 (dash-dotted line) during operation of the ICE 4. The crankshaft 8 of the ICE 4 rotates 720 degrees C.A as the four strokes of the piston 18 are performed. For each stroke, the crankshaft 8 rotates 180 degrees C.A as indicated in FIG. 5.

Along line I. the opening and closing of the exhaust and intake valves 20, 22 are shown during ordinary compression release braking, CRB, of the ICE 4 without variable valve timing. The exhaust valve 20 and the intake valve 22 are opened and closed in an ordinary manner during the respective exhaust and intake strokes. In addition, the compression release brake mechanism 34 is activated and engages with the exhaust valve 22 and the one or more additional lobes 36 of the exhaust camshaft 10. Thus, in an ordinary manner the exhaust valve 22 is opened with a CRB lift at the beginning of the expansion stroke and the compressed air in the combustion chamber 14 is released into the exhaust system of the ICE 4.

Along line II. the opening and closing of the exhaust and intake valves 20, 22 with variable valve timing applied during CRB is shown, i.e. after performing the first or second sequence S1, S2 of timing changes and the camshafts 10, 12 having the second camshaft timing setting $\beta 2$, $\alpha 2$. In the example, the control arrangement 38 changes the timing of the intake camshaft 12 to delay opening of the intake valve 22 and changes the timing of the exhaust camshaft 10 to advance closing of the exhaust valve 20. Line II. relates to a situation wherein comparatively low braking torque is applied during CRB. Thus, there may be applied a combination of a small timing change angle $\beta$ for advancing the timing of the exhaust valve 22, and a large timing change angle $\alpha$ for delaying the timing of the intake valve 22. Since compression release braking is activated, also the CRB lift of the exhaust valve 22 is advanced with the timing change angle $\beta$.

When instead a comparatively large braking torque is to be applied during CRB, there would be applied a combination of a large timing change angle $\beta$ for advancing the timing of the exhaust valve 22 and the CRB lift, and a small timing change angle $\alpha$ for delaying the timing of the intake valve 22. Again, after performing the first or second sequence S1, S2 of timing changes and the camshafts 10, 12 having the second camshaft timing setting $\beta 2$, $\alpha 2$.

Both in case of comparatively low and in particular, in case of comparatively large braking torque, the first or second sequence S1, S2 of timing changes of the camshafts 10, 12 are selected in order to avoid too high a valvetrain load during the transition from the first camshaft timing setting $\beta 1$, $\alpha 1$ to the second camshaft timing setting $\beta 2$, $\alpha 2$.

Along line III. the opening and closing of the exhaust and intake valves 20, 22 are shown during heat producing operation of the ICE 4, i.e. after performing the first or second sequence S1, S2 of timing changes and the camshafts 10, 12 having the second camshaft timing setting $\beta 2$, $\alpha 2$. In the example, the control arrangement 38 changes the timing of the exhaust camshaft 10 to advance closing of the exhaust valve 20. As a consequence, the gas flowing into the exhaust conduit 48 has an elevated temperature. The elevated temperature may be utilized/required e.g. in certain situations when an exhaust gas treatment system of the ICE 4 is to be brought to a desired temperature.

The first or second sequence S1, S2 of timing changes of the camshafts 10, 12 are selected in order to avoid too high a valvetrain load during the transition from the first camshaft timing setting $\beta 1$, $\alpha 1$ to the second camshaft timing setting $\beta 2$, $\alpha 2$.

The example presented in connection with line IV. relates to a situation in which an increase in charge air pressure is to be achieved. The movements of the exhaust valve 20 (full line) and of the intake valve 22 (dash-dotted line) are shown when the camshafts 10, 12 have the first camshaft timing setting $\beta 1$, $\alpha 1$, i.e. before performing the first or second sequence S1, S2 of timing changes. Performing the first or second sequence S1, S2 of timing changes leading to the camshafts 10, 12 having the second camshaft timing setting $\beta 2$, $\alpha 2$, is indicated with arrows. That is in the example, the control arrangement 38 changes the timing of the intake camshaft 12 to advance the opening of the intake valve 22 and changes the timing of the exhaust camshaft 10 to delay the closing of the exhaust valve 20. As a consequence, the charge air pressure increases. Such an increase in charge air pressure may for instance be desired when the ICE is operated at high altitude where ambient air pressure is lower than average.

The first or second sequence S1, S2 of timing changes of the camshafts 10, 12 are selected in order to avoid too high a pressure in the combustion chamber 14 during the transition from the first camshaft timing setting $\beta 1$, $\alpha 1$ to the second camshaft timing setting $\beta 2$, $\alpha 2$.

Figure 6:
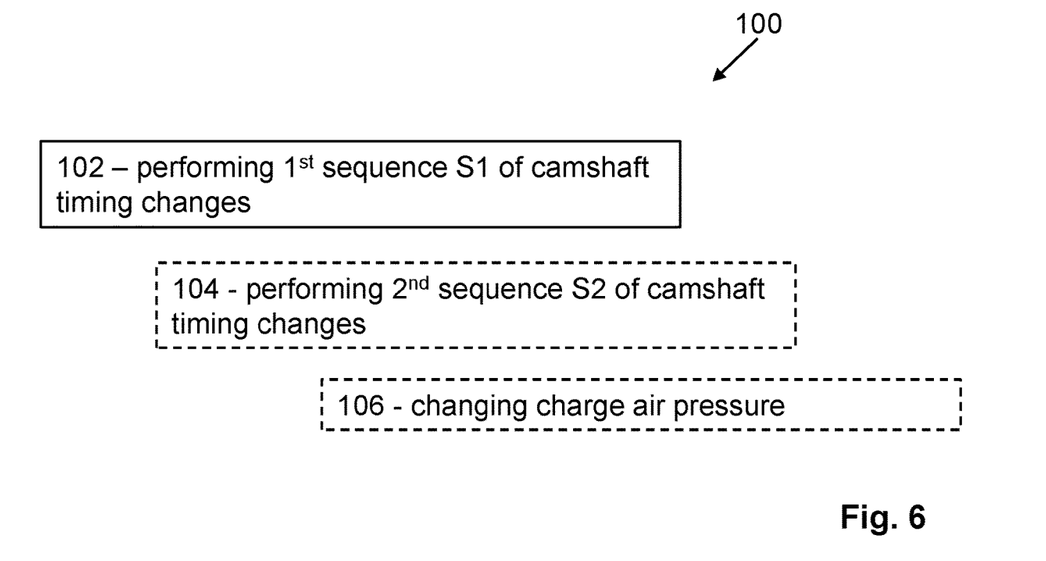
FIG. 6 illustrates embodiments of a method for controlling a variable valve timing of a four-stroke ICE.

FIG. 6 illustrates embodiments of a method 100 for controlling a variable valve timing of a four-stroke ICE. The ICE may be an ICE 4 comprising a control arrangement 38 as discussed above in connection with FIGS. 1-5. Accordingly, in the following reference is also made to FIGS. 1-5.

The method 100 comprises:

performing 102 a first sequence S1 of changes in the timings of the exhaust and intake camshafts 10, 12 in order to arrive from a first camshaft timing setting $\beta 1$, $\alpha 1$ at a second camshaft timing setting $\beta 2$, $\alpha 2$ based on a first current maximum cylinder pressure within the combustion chamber around TDCf and/or around TDCge.

Embodiments and functions of the control arrangement 38 discussed above are applicable in a corresponding manner in the method 100.

According to embodiments, the method 100 may comprise:

performing 104 a second sequence S2 of changes in the timings of the exhaust and intake camshafts 10, 12 in order to arrive from the first camshaft timing setting $\beta 1$, $\alpha 1$ at the second camshaft timing setting $\beta 2$, $\alpha 2$ based on a second current maximum cylinder pressure within the combustion chamber around TDCf and/or around TDCge. The second current maximum cylinder pressure differs from the first current maximum cylinder pressure, and the second sequence S2 of changes in the timings of the exhaust and intake camshafts 10, 12 differs from the first sequence S1 of changes in the timings of the exhaust and intake camshafts 10, 12.

According to embodiments, the second sequence S2 of changes in the timings of the exhaust and intake camshafts 10, 12 may differs from the first sequence S1 of changes in the timings of the exhaust and intake camshafts 10, 12 by number, and/or order, and/or size of timing change angles of the exhaust and/or intake camshafts 10, 12.

According to embodiments, a first time period may be utilized to perform the first sequence S1 of changes in the timings of the exhaust and intake camshafts 10, 12 in order to arrive from the first camshaft timing setting $\beta 1$, $\alpha 1$ at the second camshaft timing setting $\beta 2$, $\alpha 2$ and a second time period may be utilized to perform the second sequence S2 of changes in the timings of the exhaust and intake camshafts 10, 12 in order to arrive from the first camshaft timing setting $\beta 1$, $\alpha 1$ at the second camshaft timing setting $\beta 2$, $\alpha 2$. The first time period differs from the second time period. In this manner, the second sequence S2 may differ from the first sequence S1.

According to embodiments wherein the exhaust camshaft 10 is further arranged to control compression release braking of the ICE 4, the method 100, upon or during compression release brake activation, may carry out:

said performing 102 of the first sequence S1 of changes in the timings of the exhaust and intake camshafts 10, 12 based on the first current maximum cylinder pressure.

Further, according to embodiments wherein the method 100 comprises:

performing 104 the second sequence S2 of timing changes, the method 100, upon or during compression release brake activation, may carry out:

said performing 104 of the second sequence S2 of changes in the timings of the exhaust and intake camshafts 10, 12 based on the second current maximum cylinder pressure.

According to embodiments, wherein the ICE 4 comprises a turbocharger 44 configured to produce a charge air pressure, the method 100 may comprise:

changing 106 the charge air pressure provided by the turbocharger 44, based on the first current maximum cylinder pressure.

According to a further aspect, there is provided a computer program comprising instructions which, when the program is executed by a computer, causes the computer to carry out a method 100 according to any one of aspects and/or embodiments discussed herein.

One skilled in the art will appreciate that the method 100 of controlling timings of an exhaust camshaft 10 and an intake camshaft 12 of a four-stroke ICE 4 may be implemented by programmed instructions. These programmed instructions are typically constituted by a computer program, which, when it is executed in a computer or calculation unit 60, ensures that the computer or calculation unit 60 carries out the desired control, such as the method 100, and thereto related steps 102-106. The computer program is usually part of a computer-readable storage medium which comprises a suitable digital storage medium on which the computer program is stored.

Figure 7:
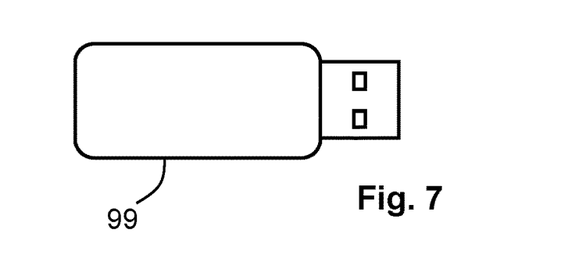
FIG. 7 illustrates embodiments of a computer-readable storage medium.

FIG. 7 illustrates embodiments of a computer-readable storage medium 99 comprising instructions which, when executed by a computer or calculation unit 60, cause the computer or calculation unit 60 to carry out the steps of the method 100 according to any one of aspects and/or embodiments discussed herein.

The computer-readable storage medium 99 may be provided for instance in the form of a data carrier carrying computer program code for performing at least some of the steps 102-106 according to some embodiments when being loaded into the one or more calculation units 60. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the calculation unit 60 remotely, e.g., over an Internet or an intranet connection, or via other wired or wireless communication systems.

The computer-readable storage medium 99 shown in FIG. 7 is a nonlimiting example in the form of a USB memory stick.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A control arrangement comprising a controller for controlling a variable valve timing of a four-stroke internal combustion engine, the internal combustion engine comprising: an exhaust valve and an intake valve, an exhaust camshaft arranged to control the opening of the exhaust valve, an intake camshaft arranged to control the opening and closing of the intake valve, and a cylinder arrangement, the cylinder arrangement comprising a combustion chamber, a cylinder bore, and a piston configured to reciprocate in the cylinder bore between a bottom dead center and a top dead center, wherein the controller is configured to:

perform a first sequence of changes in timings of the exhaust and intake camshafts in order to transition from a first camshaft timing setting to a second camshaft timing setting, where the first sequence of changes in timing is controlled based on a first current maximum cylinder pressure within the combustion chamber around top dead center fire and/or around top dead center gas exchange.

2. The control arrangement according to claim 1, wherein the controller is configured to:

perform a second sequence of changes in the timings of the exhaust and intake camshafts in order to arrive from the first camshaft timing setting at the second camshaft timing setting, where the second sequence of changes in timing is controlled based on a second current maximum cylinder pressure within the combustion chamber around top dead center fire and/or around top dead center gas exchange, wherein the second current maximum cylinder pressure differs from the first current maximum cylinder pressure, and wherein the second sequence of changes in the timings of the exhaust and intake camshafts differs from the first sequence of changes in the timings of the exhaust and intake camshafts.

3. The control arrangement according to claim 2, wherein the second sequence of changes in the timings of the exhaust and intake camshafts differs from the first sequence of changes in the timings of the exhaust and intake camshafts by a number, and/or order, and/or size of timing change angles of the exhaust and/or intake camshafts.

4. The control arrangement according to claim 2, wherein a first time period is used by said controller to perform the first sequence of changes in the timings of the exhaust and intake camshafts in order to arrive from the first camshaft timing setting at the second camshaft timing setting and a second time period is said by said controller to perform the second sequence of changes in the timings of the exhaust and intake camshafts in order to arrive from the first camshaft timing setting at the second camshaft timing setting, and wherein the first time period differs from the second time period.

5. The control arrangement according to claim 1, wherein the exhaust camshaft is further arranged to control compression release braking of the internal combustion engine, and wherein the controller is configured to, upon or during compression release brake activation, to:

perform the first sequence of changes in the timings of the exhaust and intake camshafts based on the first current maximum cylinder pressure.

6. The control arrangement according to claim 1, wherein the four-stroke internal combustion engine comprises a turbocharger configured to produce a charge air pressure, and wherein the controller is configured to:
- change the charge air pressure provided by the turbocharger, based on the first current maximum cylinder pressure.

7. A four-stroke internal combustion engine comprising:
- an exhaust valve and an intake valve;
- an exhaust camshaft arranged to control the opening of the exhaust valve;
- an intake camshaft arranged to control the opening and closing of the intake valve;
- a cylinder arrangement, the cylinder arrangement comprising a combustion chamber, a cylinder bore, and a piston configured to reciprocate in the cylinder bore between a bottom dead center and a top dead center; and
- a controller configured to perform a first sequence of changes in timings of the exhaust and intake camshafts in order to arrive from a first camshaft timing setting at a second camshaft timing setting, where the first sequence of changes in timing is controlled based on a first current maximum cylinder pressure within the combustion chamber around top dead center fire and/or around top dead center gas exchange.

8. A vehicle comprising a four-stroke internal combustion engine, said internal combustion engine comprising:
- an exhaust valve and an intake valve;
- an exhaust camshaft arranged to control the opening of the exhaust valve;
- an intake camshaft arranged to control the opening and closing of the intake valve;
- a cylinder arrangement, the cylinder arrangement comprising a combustion chamber, a cylinder bore, and a piston configured to reciprocate in the cylinder bore between bottom dead center and a top dead center; and
- a controller configured to perform a first sequence of changes in timings of the exhaust and intake camshafts in order to arrive from a first camshaft timing setting at a second camshaft timing setting, where the first sequence of changes in timing is controlled based on a first current maximum cylinder pressure within the combustion chamber around top dead center fire and/or around top dead center gas exchange.

9. A method for controlling a variable valve timing of a four-stroke internal combustion engine, the internal combustion engine comprising an exhaust valve and an intake valve, an exhaust camshaft arranged to control the opening of the exhaust valve, an intake camshaft arranged to control the opening and closing of the intake valve, and a cylinder arrangement, the cylinder arrangement comprising a combustion chamber, a cylinder bore, and a piston configured to reciprocate in the cylinder bore between a bottom dead center and a top dead center, wherein the method comprises:
- performing a first sequence of changes in timings of the exhaust and intake camshafts in order to arrive from a first camshaft timing setting at a second camshaft timing setting, where the first sequence of changes in timing is controlled based on a first current maximum cylinder pressure within the combustion chamber around top dead center fire and/or around top dead center gas exchange.

10. A computer program product comprising instructions stored on a non-transitory computer medium, instructions, when operated by one or more controllers is used for
- for controlling a variable valve timing of a four-stroke internal combustion engine, the internal combustion engine comprising: an exhaust valve and an intake valve; an exhaust camshaft arranged to control the opening of the exhaust valve; an intake camshaft arranged to control the opening and closing of the intake valve; a cylinder arrangement, the cylinder arrangement comprising a combustion chamber, and a cylinder bore, and a piston configured to reciprocate in the cylinder bore between bottom dead center and a top dead center,
- performing a first sequence of changes in the timings of the exhaust and intake camshafts in order to arrive from a first camshaft timing setting at a second camshaft timing setting, where the first sequence of changes in timing is controlled based on a first current maximum cylinder pressure within the combustion chamber around top dead center fire and/or around top dead center gas exchange.

11. The control arrangement according to claim 1, wherein the controller is configured to perform the first sequence of changes in timings of the exhaust and intake camshafts where timing of the first sequence is varied during progression of the first sequence either continuously or intermittently based on continuously or intermittently determined current maximum cylinder pressures within the combustion chamber around top dead center fire and/or around top dead center gas exchange.

12. The control arrangement according to claim 1, wherein the controller is configured to perform the first sequence of changes in timings of the exhaust and intake camshafts at a time other than when the first current maximum cylinder pressure within the combustion chamber around top dead fire and/or around top dead gas exchange exists.

* * * * *